Sept. 16, 1952 W. J. COULTAS ET AL 2,610,560
HITCH FOR IMPLEMENTS AND VEHICLES
Filed May 11, 1948 3 Sheets-Sheet 1
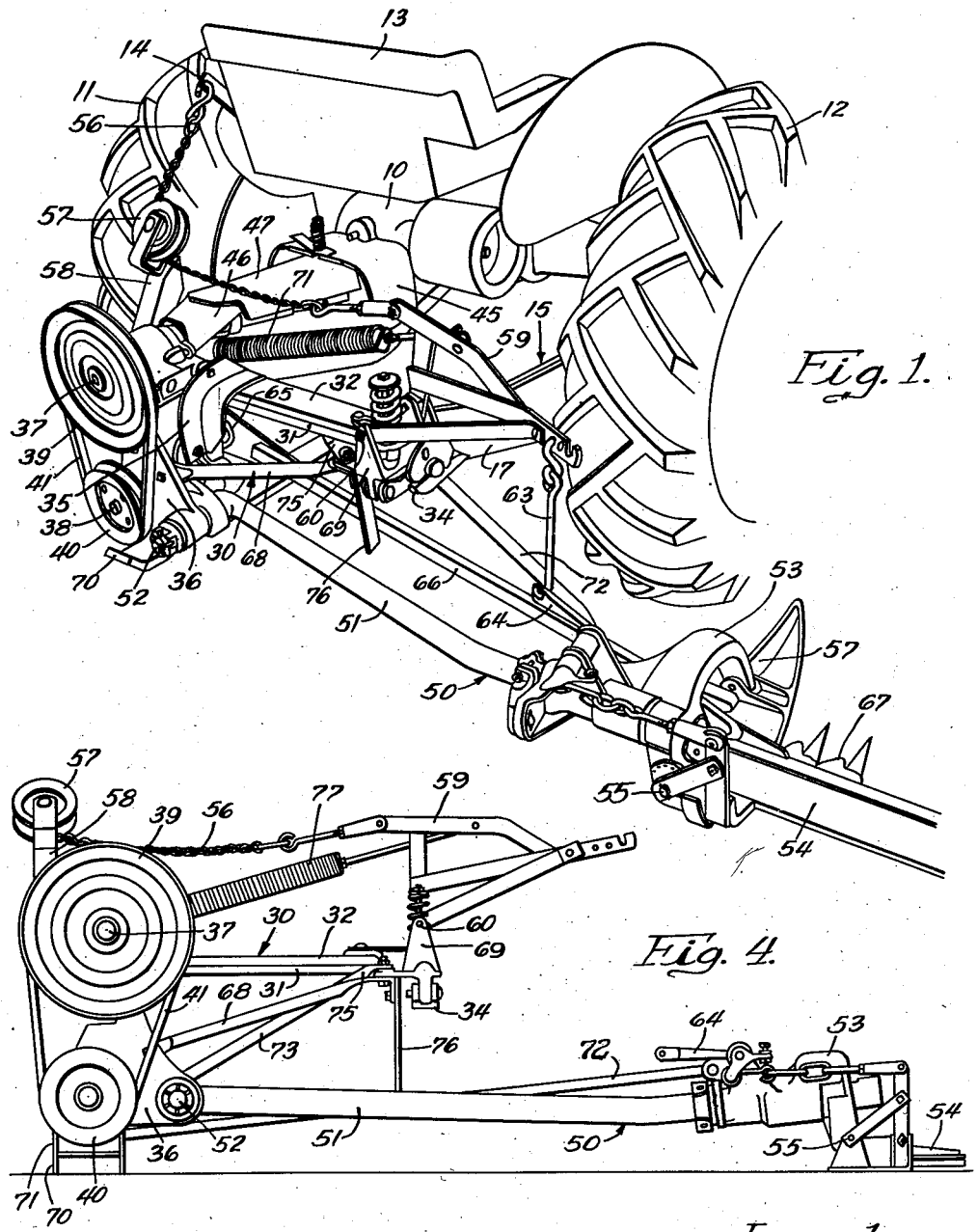
Inventors:
Wilbur J. Coultas,
Nolan D. Colvin,
William B. Palmer
By C. T. Parker
Attys.

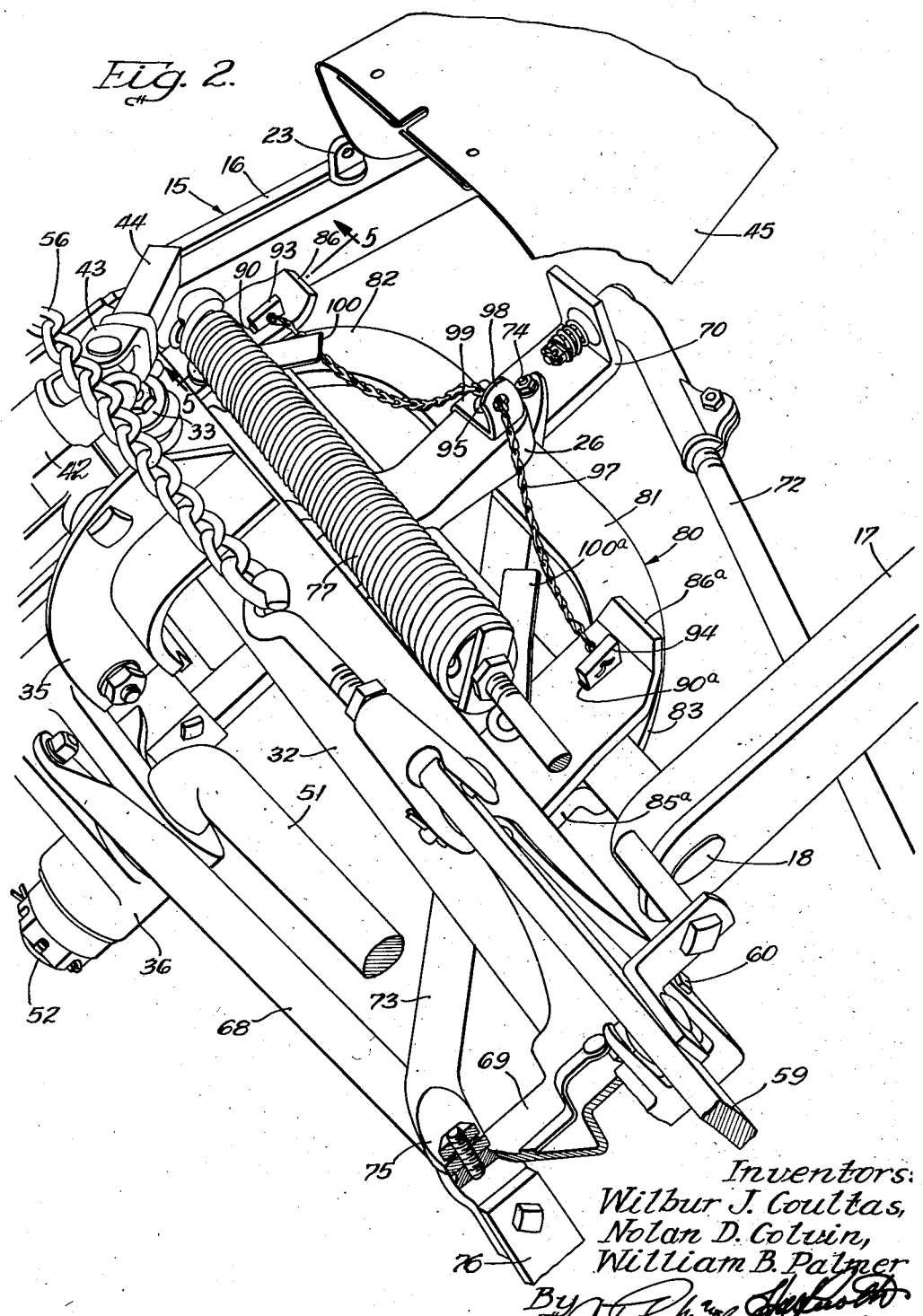

Sept. 16, 1952     W. J. COULTAS ET AL     2,610,560
HITCH FOR IMPLEMENTS AND VEHICLES
Filed May 11, 1948     3 Sheets-Sheet 3
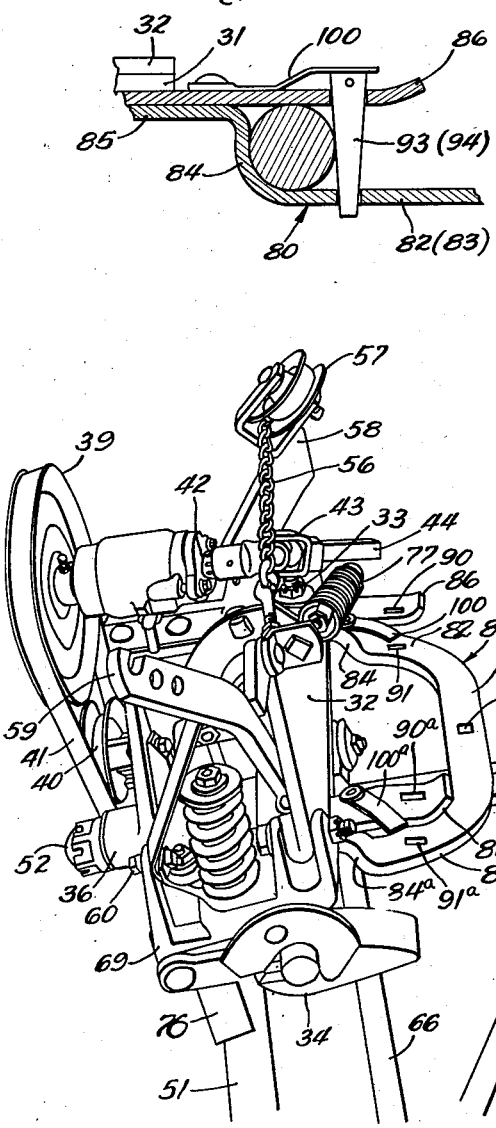
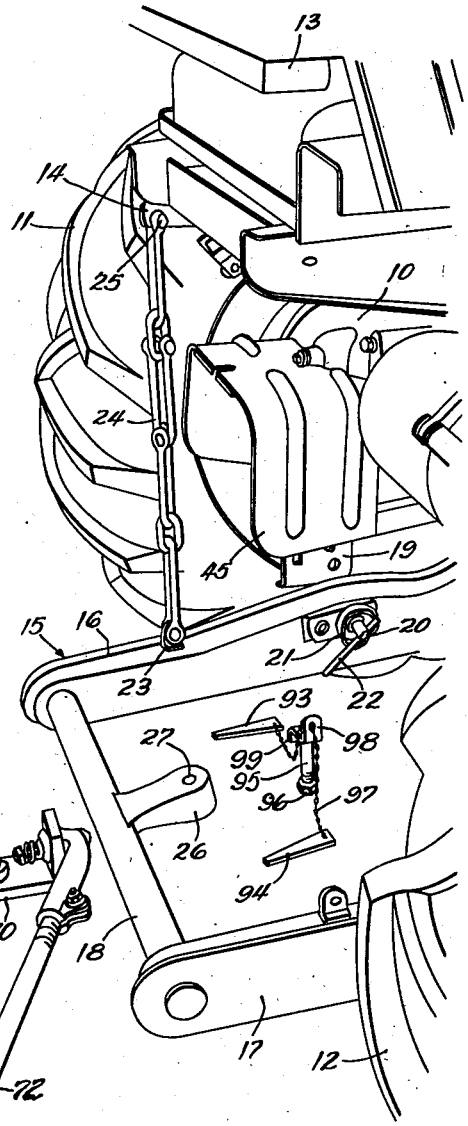
Inventors:
Wilbur J. Coultas,
Nolan D. Colvin,
William B. Palmer

UNITED STATES PATENT OFFICE 2,610,560

HITCH FOR IMPLEMENTS AND VEHICLES

Wilbur J. Coultas and Nolan D. Colvin, Moline, and William B. Palmer, Rock Island, Ill., assignors to Deere & Company, Moline, Ill., a corporation of Illinois Application May 11, 1948, Serial No. 26,324

7 Claims. (Cl. 97—47)

This invention relates to hitch means for interconnecting a propelling unit and a propelled unit and is particularly adaptable for use in the agricultural implement field in connecting agricultural implements to tractors.

One of the criteria of a practicable tractor-implement unit is the manner in which the implement is carried on the tractor and the ease with which the implement may be disconnected from and remounted on the tractor. This is particularly true in any case in which the implement is carried directly on the tractor and has no normally used ground support of its own, for, in a case where the implement has rolling ground supports, such as a trailer or pull-behind harvester, the connection of the implement to the tractor involves merely the insertion of a connecting pin between the tractor drawbar and a draft tongue on the implement.

Certain types of mowers are typical of that class of implements that is carried directly on the tractor and, although the principles of the present invention are applicable to a wide variety of implements and/or vehicles, it is primarily concerned with a mower of the type carried directly on the drawbar or other supporting structure of a tractor or similar propelling vehicle. In such mower, the drawbar extends rearwardly of the tractor and has a transverse part on which the mower is directly carried, the cutting mechanism extending laterally from the mower in a normal operating position from which it may be raised by lifting means carried on the mower frame and, in some instances, powered by means on the tractor. Heretofore, in the dismounting of such mower from the tractor drawbar, a good deal of manual labor was involved, inasmuch as the mower had to be first disconnected from the drawbar and then lowered so that it could rest on the ground; or some suitable support had to be provided for it. According to the present invention, these disadvantages are eliminated and the procedure of connecting and disconnecting a tractor and mower or other implement is simplified.

It is an important object of the invention to provide improved hitching structure on the mower or other implement so that the same may be readily installed and taken apart to increase the efficiency of the hitching means and the use of the implement with the tractor.

In its general nature, the hitching structure involves a plate-like member having laterally spaced portions turned forwardly to receive a hitching part on the tractor, these portions being apertured to receive locking members, preferably in the form of wedges, for securing the implement hitching part to the tractor hitching part. It is likewise an object of the invention to provide hitching structure in which an implement part may be temporarily supported on the tractor hitching part by means of portions that are interengageable without the need of any securing means so that the implement may be supported on the tractor against tipping in at least one direction; in other words, the hitching parts are so arranged as to take the torque normally resulting from the tendency of the implement part to tip, especially rearwardly, with respect to the tractor.

A further object of the invention relates to the provision of novel securing means for use with the hitching part, these means preferably taking the form of a pair of locking wedges and a locking pin. Another object of the invention relates to means for tying these three parts together to secure same against loss in the field.

The foregoing and other important objects and desirable features of the invention will become apparent to those skilled in the art as a detailed disclosure thereof is made in the following description and accompanying sheets of drawings, wherein the invention is shown, by way of example, in connection with a tractor and tractor-mounted mower.

In the drawings:

Figure 1 is a perspective view of the rear part of the tractor and mower unit;

Figure 2 is an enlarged perspective view showing the hitching means for connecting the mower to the tractor;

Figure 3 is a perspective view showing the tractor and mower disconnected;

Figure 4 is a rear elevational view showing the mower resting on the ground when removed from the tractor; and Figure 5 is a fragmentary sectional view taken on the line 5—5 of Figure 2 showing the details of one of the securing means.

The tractor chosen for the purposes of illustration is of a well known commercial type having certain usual components which need not be described in detail. The tractor preferably has a rear body portion 10 carried on a pair of laterally spaced traction wheels 11 and 12 between which is located an operator's seat 13. Power lift or power control mechanism, which may be of any conventional type, is located beneath the operator's seat 13 (and not visible in the drawings) and includes a transverse rockshaft (not shown) to the left hand end of which is secured a power control arm 14.

The tractor is shown as being equipped with a drawbar, designated generally by the numeral 15, comprising a pair of laterally spaced longitudinally extending side members 16 and 17 and a transverse member in the form of a cylindrical bar 18 which forms a tractor hitch part as will be hereinafter more fully pointed out. The drawbar may be of the type shown in assignee's copending application, Serial No. 700,055, filed September 28, 1946, by Bernard E. Carlson, now Patent No. 2,503,096, issued May 4, 1950. The drawbar shown in that case is carried at its forward end portion by means including a transverse pivot axis about which the drawbar may be adjusted vertically. Also, as shown in that case, the drawbar is provided with means cooperative with structural parts of the tractor for locating and locking the drawbar in any one of a plurality of selected positions. In the present case, the locking means is shown as including a perforated plate 19 carried by the tractor and cooperative with a locking pin 20 carried by the proximate drawbar side member 16. The drawbar member 16 further carries a control member 21 having its inner face formed as a cam having high and low portions selectively engageable with a handle portion 22 which passes through the inner end of the pin 20. When the handle portion 22 engages the high portions of the cam on the control member 21, the pin 20 is withdrawn from engagement with any of the apertures in the locking plate 19; and, consequently, the drawbar 15 is free to be moved vertically. A similar locking means may be provided at the other side of the drawbar for cooperation with the drawbar member 17. As shown in Figure 3, the left hand side member 16 of the drawbar member 15 carries rigidly thereon an attaching ear 23 to which may be attached one end of a lifting chain 24, the other end of which may be connected at 25 to the end of the power control arm 14. Thus, by means of the power control mechanism, the vertical position of the drawbar 15 may be changed, after which the position may be maintained by rotating the pin 20 by means of the handle 22 so that the latter is permitted to drop into the low portions of the cam face of the member 21, the pin 20 thereby entering a selected one of the openings in the locking plate 19.

The tractor hitching part includes the bar 18 which has rigidly secured thereto, preferably at a point intermediate its opposite ends, a forwardly extending member 26 provided with a vertical aperture 27, the apertured portion of the member 26 being disposed in longitudinally spaced relation to the transverse bar 18. Since the bar 18 is rigidly secured at its opposite ends to the drawbar members 16 and 17, the structure involving the parts 18 and 26 is rigid and unitary and will accept the application of torque thereto within the necessary limits.

The particular type of mower illustrated here forms no part of the present invention and the detailed structure thereof is embraced in our copending application, Serial No. 26,323, filed May 11, 1948, now Patent No. 2,574,691, issued November 13, 1951. For the purposes of the present disclosure, it will suffice to note that the mower has a frame, indicated generally by the numeral 30, comprising a pair of transversely extending frame bars 31 and 32. The member 31 is a lower member and forms the basic part of the mower frame to which the hitching structure is attached, so that the member 31 forms, in effect, a part of the hitching and supporting structure including the transverse member 18 and the drawbar 15 in general. The second or upper transverse bar 32 carries the main component of the mower and, in the particular case illustrated, is pivoted at its stubbleward end to the stubbleward end portion of the lower member 31 for rearward swinging movement about a vertical axis provided by the pivot, a principle that is broadly conventional. In Figure 2, the pivot means is visible at 33 (see also Figure 3). The grassward end of the upper frame bar 32 is releasably secured to the lower member 31 by spring-loaded release mechanism, indicated generally by the numeral 34. This mechanism may be of any conventional construction but is here shown as being of the type shown in the U. S. patent to Coultas, 2,292,362.

The stubbleward end of the upper transverse member or bar 32 has rigidly secured thereto a rearwardly and downwardly extending angle member 35 which provides means for carrying a casting or housing 36. This housing journals upper and lower shafts 37 and 38, respectively, which are connected in driving relationship by a large pulley 39, a small pulley 40 and a driving belt 41. The upper shaft 37 extends forwardly of the housing, as at 42 (Figures 2 and 3), at which point it has a universal joint connection 43 with a forwardly extending shaft part 44 of what may be a conventional telescopic propeller shaft means between the shaft 42 and the power take-off shaft (not shown) of the tractor. In the present case the power take-off shaft is concealed by a power take-off shield 45 which may be of any standard construction. In Figure 1, the housing 36 is shown as having at its forward portion a secondary shield member 46 between which and the shield member 45 an intermediate shield 47 may be connected, all in the accepted and well known manner. It will be understood that these shield sections are disconnectible when the mower is removed from the tractor, a construction and procedure that is common to implements of the type referred to.

The lower portion of the casting or housing 36 provides means for carrying cutting mechanism, indicated generally by the numeral 50. The cutting mechanism includes a laterally extending drag bar 51 which has an inner bent end 52 pivoted on a longitudinal horizontal axis to the housing or casting 36. The outer or grassward end of the drag bar 51 is connected in the usual manner to a yoke 53 to which a cutter bar 54 is pivoted on a longitudinal horizontal axis, as at 55.

When the mower is connected to the tractor in operating position, the lifting chain 24 between the power control arm 14 and the drawbar 15 is removed to provide for the connection to the power control arm 14 of a lifting chain 56. This chain passes around a sheave 57 carried on a bracket 58 secured to the stubbleward end of the upper transverse frame bar 32; the chain extends grasswardly from the sheave to a connection with a bell crank 59 which is pivoted on a longitudinal horizontal axis at 60 to the grassward end of the frame member 32. The other arm of the bell crank is connected by means of a link 63 to what may be conventional gag lever mechanism 64 carried on the yoke 53 and in turn connected to the cutter bar 54, whereby the cutter bar may be raised and lowered by means of power developed by the power control arm 14.

The lower shaft 38 that is journaled in the casting or housing 36 extends forwardly and may be provided with an eccentric of usual construction, designated by the numeral 65 in Figures 1 and 3, to which is connected the inner or stubbleward end of a transversely extending pitman 66, the outer end of which may be connected in the usual manner to a knife or sickle 67 carried by the cutter bar 54. As best seen in Figure 4, a diagonal brace 68 extends grasswardly from a connection on the casting or housing 36 to a rigid connection on the grassward end of the transverse frame member or bar 32, the latter connection being accomplished through the medium of a bracket 69 which serves to carry the releasable mechanism 64 and to provide for the mounting of the pivot 60 of the bell crank 59.

The mower construction is provided at the stubbleward side thereof with a ground engaging member preferably in the form of a longitudinally extending skid 70 rigidly secured at 71 to a lower portion of the casting or housing (Figure 4) and extending forwardly therefrom to a point where it is connected to the forward end of a rearwardly and diagonally extending brace 72, the rear end of which is connected to the grassward end of the drag bar 51 (Figure 1). The forward portion of the skid 70 is further braced with respect to the frame structure by means of a rearwardly and diagonally extending brace 73 connected at its forward end, at 74, to the forward portion of the skid 70 and at its rearward portion, at 75, to the bracket 69 previously referred to (Figure 2). As best seen in Figure 4, the skid 70 may rest upon the ground and support the stubbleward side of the mower when the mower is disconnected from the tractor. There is provided at the grassward side of the mower a depending support or stop means in the form of a vertical member 76 which depends from and is rigidly connected to the grassward end of the frame bar 32 by means of the bracket 69 previously referred to. In the detached position of the mower as shown in Figure 4, the member 76 is adapted to engage a mid-portion of the drag bar 51, thereby supporting the grassward end of the mower on the coupling bar, which is in turn supported by the cutter bar shoe at the yoke end of the drag bar. In the operating position of the mower, as shown in Figure 1, the member 76 serves as a stop to limit upward swinging of the drag bar 51.

To assist in raising the cutter bar 54, a coiled tension spring 77 is connected at one end to the stubbleward end of the frame member 32 and at its other end to a portion of the bell crank 59. This detail, like other details of the mower construction referred to above, forms no part of the present invention and has been illustrated and described only in connection with the disclosure of one type of implement with which the improved hitching arrangement may be used. The details of the mower construction and the raising and lowering means for the cutter bar thereof are disclosed and claimed in our co-pending application, Serial No. 26,323, filed May 11, 1948, now Patent No. 2,574,691, issued November 13, 1951.

For the purposes of considering the applicability of the hitching structure provided by the present invention to an implement exemplified by the mower construction set forth herein, the two frame members 31 and 32 may be considered as one and hereafter reference will be made thereto collectively by reference to the mower structure 30 in general.

The implement or mower part, which comprises a cooperating hitching part for association with the tractor hitching part including the transverse bar 18, is provided with structure having a forwardly opening pocket adapted to receive and engage the transverse bar 18. This structure is designated generally by the numeral 80 and comprises a main body portion generally of plate-like construction preferably in the form of a horizontal U having a transverse bight portion 81 and rearwardly extending leg portions 82 and 83. The rear end portions of the legs 82 and 83 are rigidly secured to the mower 30, specifically by means of being secured to the lower transverse frame bar 31 (Figure 5). The structure provided by the U-shaped member affords an element of substantial lateral extent and the leg portions 82 and 83 provide laterally spaced apart portions cooperative with the tractor drawbar 15 in a manner to be set forth. Referring now to Figure 5 and considering the illustration there as representative of the construction of the leg portion 82, it will be seen that the leg portion is provided at a rear part thereof with a vertically extending portion or abutment 84 which in this case is turned rearwardly at 85 to provide means for rigidly carrying a forwardly extending lip portion 86. Broadly speaking, the portion 86 may be considered a forwardly turned portion of the leg 82 and the rear part of the portion 86 serves as part of the means by which the structure 80 is rigidly attached to the mower 30, as will be evident in Figure 5. The other leg portion 83 has portions 84ª, 85ª and 86ª which correspond respectively to the portions 84, 85 and 86 of the leg 82.

The portions 86 and 86ª are respectively spaced vertically above the proximate leg portions 82 and 83 a distance corresponding substantially to the vertical dimension (here the diameter) of the transverse hitch part comprising the drawbar member 18. Each of the portions 86 and 86ª and its associated leg portion 82 or 83 thus forms a pocket opening forwardly or toward the tractor, so that access to the pocket may be had from front to rear, thereby providing for connection of the mower and tractor by the simple expedient of backing the tractor until the transverse drawbar part 18 is received by the pockets formed by the portions 82 and 86 and 83 and 86ª. It will be noted further that the bight portion of the U-shaped structure 80 is disposed a considerable distance forwardly of the pocket-forming portion of the structure. Specifically, the bight 81 is located forwardly of the pocket-forming means a distance substantially equal to the distance between the forwardly apertured portion of the member 26 on the transverse bar 18 and the rear part of the bar 18, so that when the hitching parts are connected, the forward portion of the structure 80—or bight 81 of the U—is directly below the forward portion of the forwardly extending member 26 on the drawbar 15. The bight 81 engages the portion 26 from below and the portions 86 engage the transverse drawbar part 18 from above, thereby effecting a lever action whereby the rearwardly overhanging weight of the implement or mower applies torque to the transverse bar 18 through the structure 80 and the forwardly extending member 26 on the drawbar. Since the bight 81 engages the member 26 from below, the mower cannot tip rearwardly about the transverse bar 18 as a fulcrum. Consequently, when the hitching parts are engaged, the drawbar 15 may be raised or lowered without the necessity of any additional securing means.

However, during operation, it is required that the mower be rigidly carried by the drawbar 15. For this purpose there is provided a plurality of securing means for securing the hitching parts together. The portions 86 and 86ª are provided respectively with longitudinally extending slots 90 and 90ª and the portions of the proximate legs 82 and 83 directly therebelow are provided respectively with cooperative longitudinally extending slot 91. The bight 81 of the structure 80 is centrally apertured at 92. When the hitching parts are associated in connecting relationship, with the transverse bar 18 received in the pocket formed by the portions 86 and 86ª and 82 and 83, the apertures 90 and 91 and 90ª and 91ª are vertically aligned ahead of the bar 18; and the aperture 92 is vertically aligned with the aperture 27 in the forwardly extending member 26 of the drawbar 15. The securing means for connecting the hitching structure together at the point of engagement between the drawbar member 18 and the pocket-forming means on the structure 80 comprises a pair of securing members preferably in the form of wedges 93 and 94. The wedge 93 is inserted vertically from above through the aligned apertures 90 and 91 at the left hand side of the structure 80, it being understood that the wedge passes ahead of the transverse bar 18, as best shown in Figure 5. The wedge 94 is similarly applied at the right hand side of the structure 80. The bight portion 81 of the structure is rigidly connected to the forwardly extending member 26 of the drawbar 15 by means of a vertical securing pin 95 preferably in the form of a bolt having a headed upper end and a threaded lower end, the latter of which receives a nut 96. For the purpose of preventing loss of the individual securing elements, they are tied together by a flexible element in the form of a chain 97 which has its opposite ends suitably attached to the wedges 93 and 94 and which has its intermediate portion passing through an apertured member 98 carried by the headed end of the pin 95. The heading of the pin 95 is here accomplished preferably by means of upsetting the head end of the pin for the purposes of rigidly securing the pin, as by welding, to the locking member 98. The locking member is provided at one side thereof with a depending or bent down flange 99 which is engageable with one side of the forwardly extending member 26 to prevent turning of the pin in the aligned apertures 27 and 92. This arrangement locks the pin or bolt against turning and prevents loosening of the nut 96.

As best shown in Figure 5, the upper portions 86 and 86ª of the structure 80 have means, preferably in the form of pivoted spring clips 100 and 100ª respectively engageable with the upper portions of the wedges 93 and 94 to hold the latter in locking position.

The use and operation of the implement with the tractor will be considered first from the standpoint of mounting the mower on the tractor, in which case the mower is positioned first as shown in Figures 3 and 4 and subsequently as shown in Figures 1 and 2. As shown in Figure 4, the mower is resting on the ground and is supported by means of the skid 70 and cutting mechanism shoe, the support in the latter respect being effected by the vertical member 76. The lifting chain 24 is connected between the power control arm 14 and the drawbar 15 and the tractor is backed toward the mower. The power control arm 14 is actuated to line up the transverse drawbar member 18 horizontally with the pocket-forming structure 80, after which the tractor is backed until the member or bar 18 is received in the pockets formed by the legs 82 and 83 and associated portions 86 and 86ª. The bight portion 81 of the U-shaped structure passes beneath the member 26 and engages that member from below. The power control arm 14 may then be again actuated to raise the mower to its normal operating position, which step in the procedure is taken before inserting the wedges 93 and 94 or the pin 95. Inasmuch as the bight 81 engages the member 26 from below, the implement cannot tip rearwardly about the transverse bar 18 as a fulcrum. After the drawbar has been raised to its desired position, it is locked in place by the locking means 19—22 previously described. The lifting chain 24 may then be removed between the drawbar 15 and the power arm 14.

The wedges 93 and 94 and the pin or bolt 95 are then put in place and the clips 100 and 100ª are pivoted to positions respectively above the wedges to hold the wedges in place. The nut 96 is threaded onto the lower end of the pin or bolt 95. The lifting chain 56 is connected to the arm 14. The propeller shaft means, including the part 44, is then connected to the power take-off shaft of the tractor and the shield parts 45, 46 and 47 are put in place. The mower is now ready for operation.

The mower may be just as readily disconnected from the tractor by reversing the foregoing procedure as follows: The lifting chain 56 is disconnected from the power control arm 14 and the lifting chain 24 is connected between the arm and the drawbar 15. The release means 19—22 is then released so that the drawbar may be freely swung about its transverse pivot axis. The safety shielding 45—46—47 is next removed. The spring clips 100 and 100ª are pivoted to one side to permit removal of the wedges 93 and 94 and these wedges and the pin 95 are removed. The power control arm 14 is then actuated to lower the drawbar 15 until the mower again rests upon the ground as shown in Figure 4. The tractor is then driven forwardly away from the mower.

We are aware that the principles of the invention may be embodied in various specific forms for application to implements of different types and therefore do not intend that our invention be limited to the precise details of construction and operation herein set forth as a basis for a disclosure of a preferred form of the invention. Likewise, several modifications and alterations in the preferred form shown will undoubtedly suggest themselves to those skilled in the art, all of which may be made without departing from the spirit and scope of the invention as defined in the appended claims.

We claim:

1. A hitch element, comprising: a U-shaped member of plate-like construction in which the bight of the U is substantially centrally apertured and the bight and portions of the legs of the U proximate to the bight lie substantially in the same plane, and a portion of each leg remote from the bight is offset from said plane and has a portion extending back toward the bight in generally parallel spaced relation to the coplanar portion of the leg, each of said extending portions having an aperture and each coplanar leg portion having a comparable aperture, each pair of said cooperable apertures being respectively alined on an axis generally normal to the plane of the member.

2. Hitch structure for connecting an implement to a tractor, comprising: a tractor hitch part including a horizontal, elongated bar having front and rear sides, a member rigid on the bar substantially at a midpoint thereof and extending horizontally forwardly therefrom, and means providing a vertical aperture in said member; and an implement hitching part including a generally horizontal U-shaped element having its bight positionable below and engaging said member with its legs spaced lengthwise of the bar and extending below and rearwardly beyond the bar, means providing a vertical aperture in the bight for alinement with the member aperture, a removable securing pin passing through said apertures, and means on the legs providing a pair of forwardly opening pockets spaced lengthwise of the bar and separably receiving the bar, said pocket-forming means including, on each leg, a first portion in the form of an abutment joined to the leg to engage the bar from behind and a second portion in the form of a lip joined to the abutment and extending forwardly over and engageable with the bar from above.

3. The invention defined in claim 2, further characterized in that: each of said lips of the pocket-forming means projects ahead of the bar and has a vertical aperture therein just ahead of the bar; each leg in a portion thereof directly below said apertured second portion has a cooperable vertical aperture; and a pair of removable securing elements is provided, one for each pocket and received by the respective cooperable apertures ahead of the bar.

4. The invention defined in claim 2, further characterized in that: each of said lips of the pocket-forming means projects ahead of the bar and has a vertical aperture therein just ahead of the bar; each leg in a portion thereof directly below said apertured lip has a cooperable vertical aperture; and a pair of removable wedges are respectively received by said alined apertures and engageable with forward portions of the bar to confine the bar between the wedges and the abutments on the pocket-forming means.

5. The invention defined in claim 2, further characterized in that: each of said lips of the pocket-forming means projects ahead of the bar and has a vertical aperture therein just ahead of the bar; each leg in a portion thereof directly below said apertured lip has a cooperable vertical aperture; a pair of removable securing elements is provided, one for each pocket and received by the respective cooperable apertures ahead of the bar; and the pocket-forming means includes means for retaining the pair of securing elements.

6. The invention defined in claim 2, further characterized in that: each of said lips of the pocket-forming means projects ahead of the bar and has a vertical aperture therein just ahead of the bar; each leg in a portion thereof directly below said apertured lip has a cooperable vertical aperture; a pair of removable securing elements is provided, one for each pocket and received by the respective cooperable apertures ahead of the bar; and a flexible connecting member is provided and interconnects the securing pin and the pair of securing elements to prevent accidental separation thereof from each other when removed from the hitch parts.

7. The invention defined in claim 2, further characterized in that: each of said lips of the pocket-forming means projects ahead of the bar and has a vertical aperture therein just ahead of the bar; each leg in a portion thereof directly below said apertured lip has a cooperable vertical aperture; a pair of removable securing elements is provided, one for each pocket and received by the respective cooperable apertures ahead of the bar; the securing pin is threaded at one end and receives a threaded nut; a lock member is provided on the securing pin including a portion engaging the pin and a portion engageable with one of the hitch parts to prevent rotation of the pin; and a flexible element is provided and interconnects the securing pin and the pair of securing elements to prevent accidental separation thereof when moved from the hitch parts, the connection of said flexible element and the securing pin being effected by means of said lock member.

WILBUR J. COULTAS.
NOLAN D. COLVIN.
WILLIAM B. PALMER.

REFERENCES CITED

The following references are of record in the file of this patent:

UNITED STATES PATENTS

| Number | Name | Date |
|---|---|---|
| 1,049,297 | Hansmann | Dec. 31, 1912 |
| 1,217,257 | Witry | Feb. 27, 1917 |
| 1,365,376 | Caswell et al. | Jan. 11, 1921 |
| 1,414,770 | Blain | May 2, 1922 |
| 2,256,563 | Kamplade | Sept. 23, 1941 |
| 2,392,903 | Currie | Jan. 15, 1946 |
| 2,483,565 | Strandlund | Oct. 4, 1949 |

FOREIGN PATENTS

| Number | Country | Date |
|---|---|---|
| 20,546 of 1929 | Australia | June 10, 1929 |